United States Patent
Clum et al.

(10) Patent No.: US 7,475,928 B1
(45) Date of Patent: Jan. 13, 2009

(54) COLLAPSIBLE TRUCK CAB SAFETY BARRIER

(76) Inventors: Steven Peter Clum, 2 Mill Pond Rd., Marlboro, NY (US) 12542; Jennifer Clum, 2 Mill Pond Rd., Marlboro, NY (US) 12542

( * ) Notice: Subject to any disclaimer, the term of this patent is extended or adjusted under 35 U.S.C. 154(b) by 0 days.

(21) Appl. No.: 11/978,454

(22) Filed: Oct. 30, 2007

Related U.S. Application Data

(60) Provisional application No. 60/856,394, filed on Nov. 3, 2006.

(51) Int. Cl.
*B62D 39/00* (2006.01)

(52) U.S. Cl. .................. 296/1.04; 280/748; 280/770

(58) Field of Classification Search ............ 296/1.04, 296/146.1, 152; 49/50, 57, 62, 463; 280/748, 280/770
See application file for complete search history.

(56) References Cited

U.S. PATENT DOCUMENTS

| | | | | |
|---|---|---|---|---|
| 3,664,704 A | * | 5/1972 | Ellis | 296/37.6 |
| 4,149,342 A | * | 4/1979 | Bowers | 49/55 |
| 4,611,824 A | * | 9/1986 | McIntosh | 280/748 |
| D337,556 S | * | 7/1993 | Gros | D12/167 |
| 5,258,893 A | * | 11/1993 | Finneyfrock | 362/485 |
| 5,419,605 A | * | 5/1995 | Puaatuua | 296/146.1 |
| D365,323 S | | 12/1995 | Napierkowski | |
| 5,480,205 A | | 1/1996 | Tayar | |
| 5,511,848 A | * | 4/1996 | Mobley | 296/183.1 |
| 5,628,540 A | * | 5/1997 | James | 296/3 |
| 5,954,384 A | * | 9/1999 | Jones | 296/95.1 |
| 6,283,525 B1 | | 9/2001 | Morse | |
| 6,557,917 B1 | | 5/2003 | Colcombe | |
| 2003/0011180 A1 | * | 1/2003 | Coffman et al. | 280/748 |
| 2008/0048429 A1 | * | 2/2008 | German | 280/770 |

* cited by examiner

*Primary Examiner*—Lori L Lyjak

(57) ABSTRACT

A collapsible safety barrier for protecting the rear window of the pickup truck and occupants in the cab, from any shifting cargo being transported in the bed.

A collapsible safety barrier attached to the inside front bed rail of a pickup truck beneath the exterior of the rear cab window. When erected in the upright position, above said barrier protects passengers in truck cab from shifting cargo in the bed of the truck. In addition, from the erected position, said barrier permits protecting the front window of any installed truck cap from shifting or loading cargo. When not in use, said barrier retracts up to 180 degrees to an inverted position within the confines of a truck bed. When collapsed, it allows use of a rear split window for accessing the cargo area from within the cab or installation of truck bed cover.

6 Claims, 4 Drawing Sheets

COLLAPSIBLE TRUCK CAB SAFETY BARRIER

CROSS-REFERENCED TO RELATED APPLICATIONS

This application claims the benefit of provisional patent application Ser. No. 60/856,394, filed 2006 Nov. 3 by the present inventors.

FEDERALLY SPONSORED RESEARCH

Not Applicable

SEQUENCE LISTING OR PROGRAM

Not Applicable

BACKGROUND

1. Field of Invention

This invention relates to a truck cab safety barrier, specifically, one that collapses so as to allow for the adaptation and use of such options as a truck cap, bed cover, and/or split or retractable rear windows.

2. Prior Art

The Department of Transportation periodically addresses new safety concerns and, consequently, establishes (or revises) mandates for automobile manufactures with the new requirements, such as various protection devises to mitigate the forces from outside intrusion. Head restraints and side impact airbags are examples of this. This trend should ultimately lend more credence to more basic and simple safety devises, like "Headache Racks," as they apply to pick-up trucks.

Present day pickup trucks offer options such as rear split or fully-retractable windows, which provide more diversity and are commonly preferred. Truck caps and other optional covers are further examples of functional pickup truck options.

Existing safety barriers, commonly referred to as "headache racks," mount on the tops of truck bed sidewalls, and remain fixed, disallowing the use of truck caps, truck bed covers or access through the rear cab window itself. A good example of such a conventional 'Headache Rack' is in U.S. Pat. No. 7,121,585 to Leslie Cole (2005).

While Cole's Universal Cab Guard provides the fundamentals for maintaining truck cab safety, it is omni-present, stationary, heavy and clunky with lots of hardware to disassemble when not needed. These ubiquitous existing 'headache racks' permanently encumber the driver's visual acuity through the rear window. As a stationary device, the prior art conflicts with access through the rear window and, without its removal, prohibits installation of a truck bed cap or cover. These existing fixed, heavy barriers require strength and coordination to remove. Once removed, these existing devices are clunky and inflexible for storage options.

SUMMARY

In accordance with one embodiment a safety barrier designed to be versatile as it offers safety, when needed, and a collapsible, stowed away position, when not needed.

DRAWINGS

Figures

In the drawings, closely related figures have the same number but different alphabetic suffixes.

Figure 5:
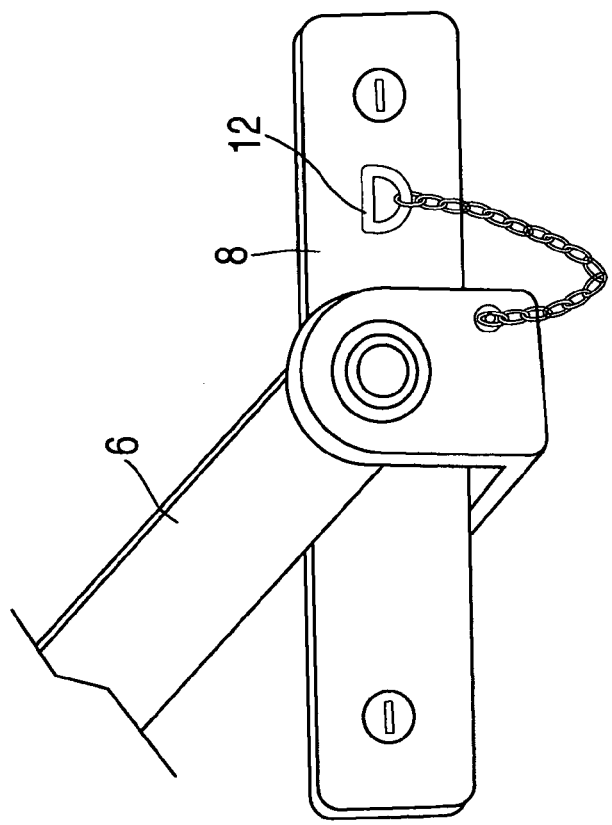

FIG. 5 is a partial depiction of the safety barrier at the quick release pins connecting a lower side angle support arm 6 to a lower support bracket 8 mounted to the inside of a truck bed side rail 16.

DRAWINGS

Reference Numerals 2 barrier
4 base hinge brackets
6 lower side angle support arms
8 lower mounting brackets
10 tensioning knob
12 quick release pin with cable tie
14 inside front bed rail
16 inside truck bed side rail
18 upper side angle support arms
20 rear truck window

DETAILED DESCRIPTION

FIGS. 1A, 1B, 1C, 3 AND 5—Preferred Embodiment

While the Collapsible Truck Cab Safety Barrier is susceptible of embodiment in many different forms, shown in the drawings and will be described in details herein, there is one specific embodiment with the understanding that the present disclosure is to be considered as an example of the principals of the invention and is not intended to limit the invention to the embodiment illustrated and described.

Figure 1A:
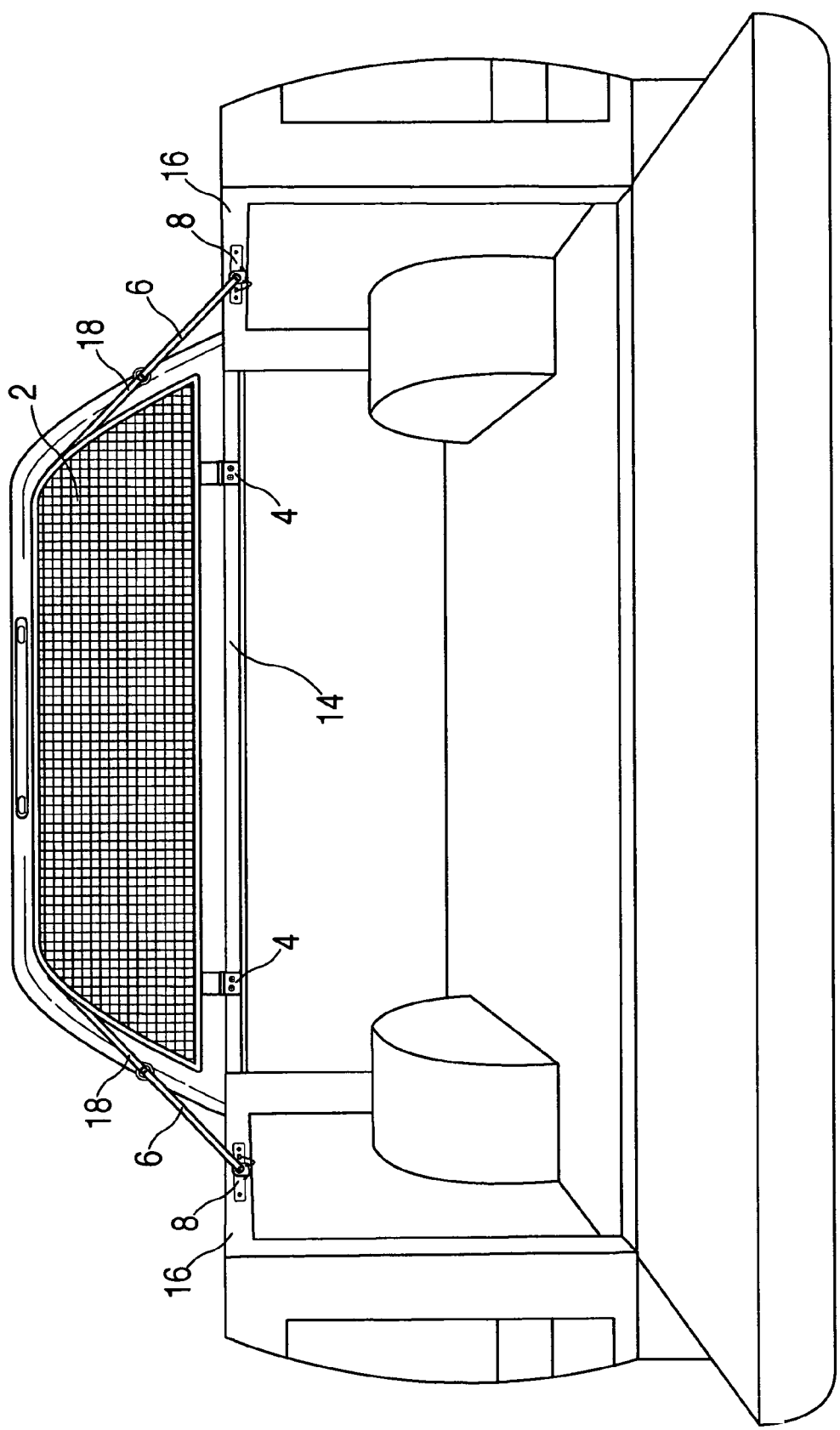
FIG. 1A depicts the safety barrier from the rear view of a truck, in its erected, first position to the preferred embodiment.
Figure 1B:
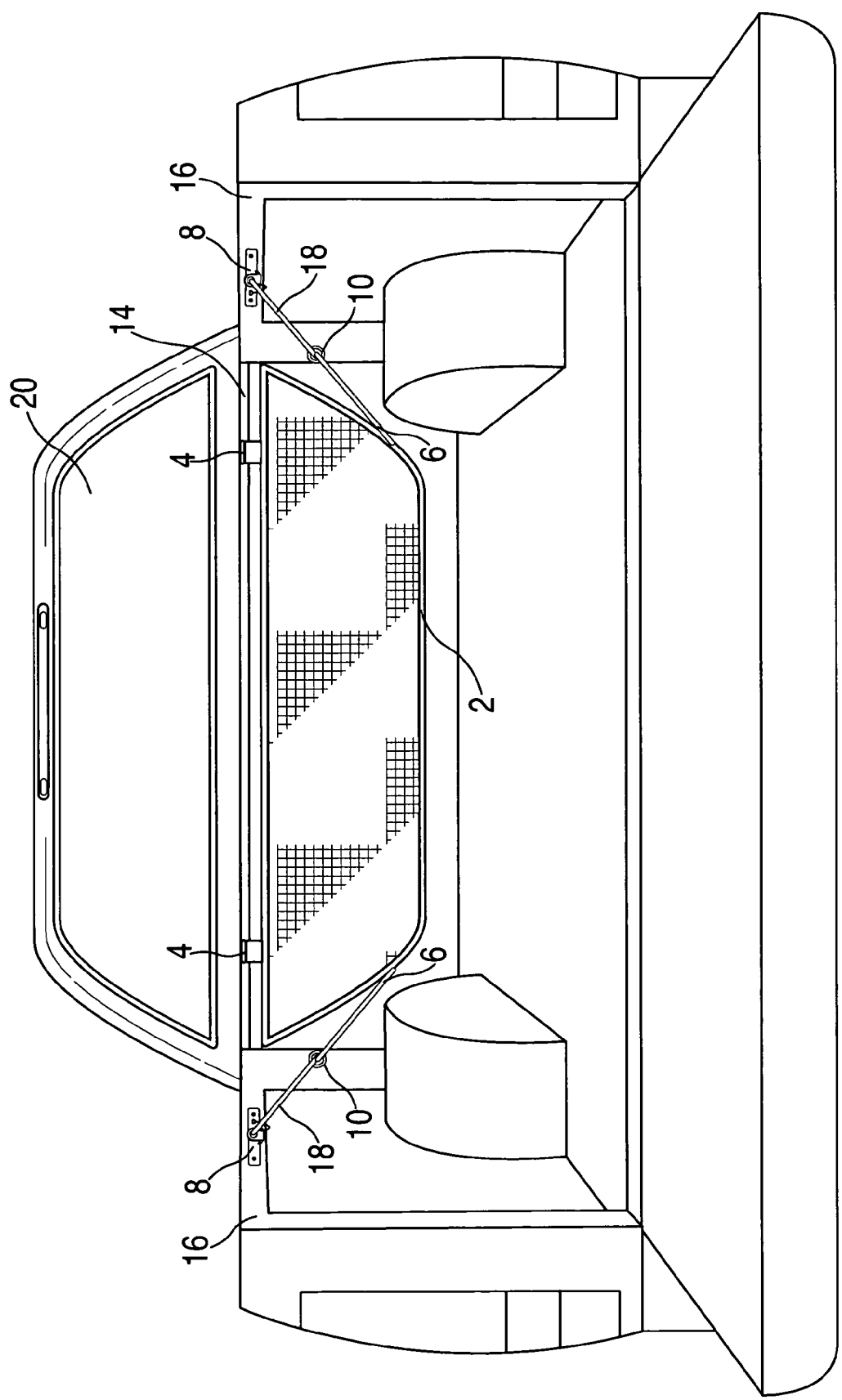
FIG. 1B depicts the safety barrier in its inverted, second, stowed away position of the preferred embodiment.
Figure 1C:
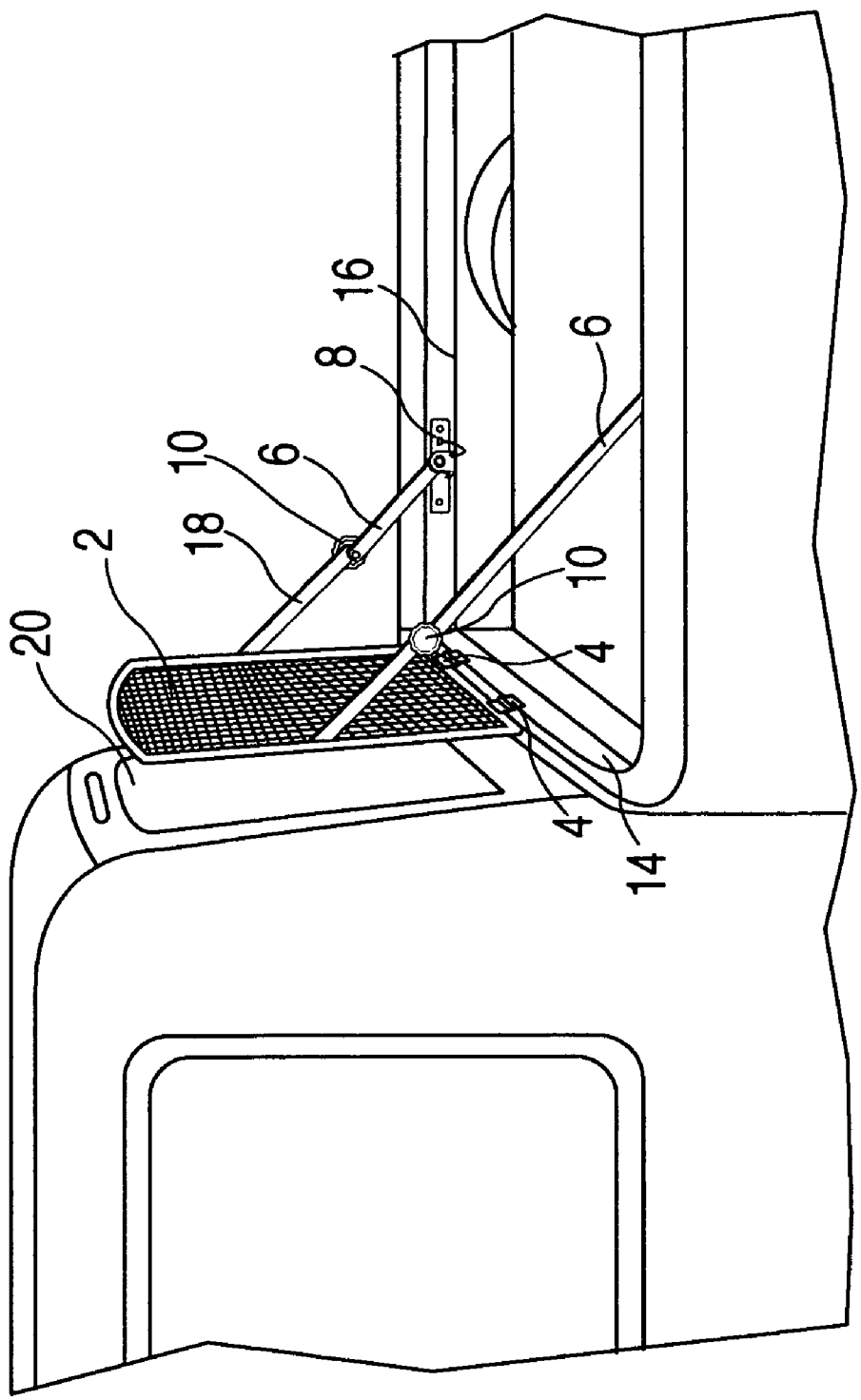
FIG. 1C depicts a side view of the safety barrier in it's upright position.

One embodiment of the collapsible truck cab safety barrier is illustrated in FIG. 1A (rear view) and FIG. 1C (side view) both of which depict the safety barrier 2 in its upright, in use safety position. FIG. 1B shows the safety barrier in its folded or retracted, non-safety use position. Together, the above illustrations demonstrate the location by which the safety barrier rotates, installed below the rear truck window 20 and mounted by way of the hinges 4 to the inside front bed rail 14. The size of the hinges 4 shall be dictated by the vertical distance between the bottom of the rear truck window 20 and the bottom of the inside front bed rail 14 and should align the perimeter of the safety barrier 2 with the perimeter of the rear truck window 20 when erected to its upright position. This point of connection to the truck below the top of the bed rail 14 allows for the application of many truck options such as truck caps, or when barrier is folded down, a bed cover.

Figure 3:
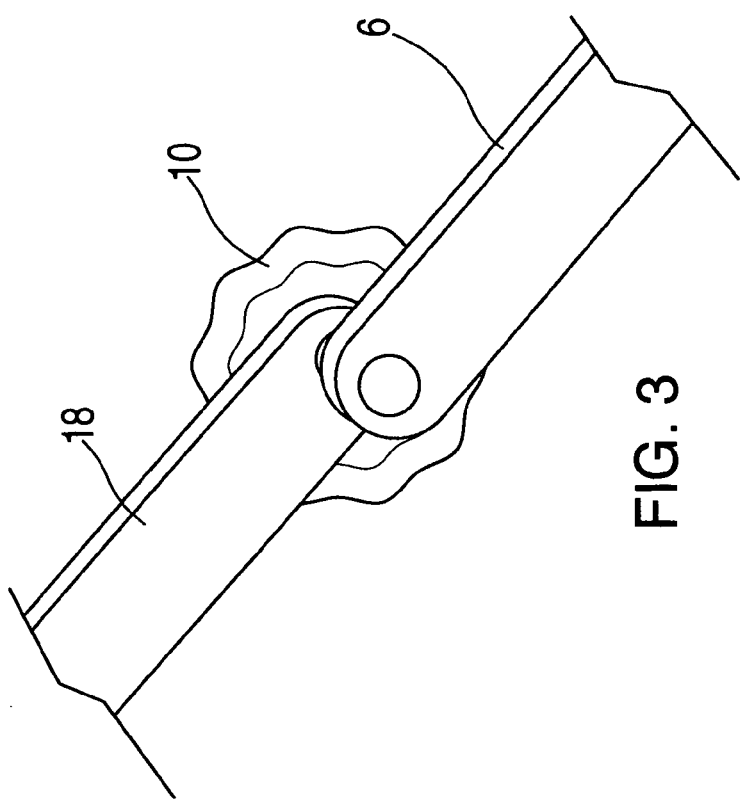
FIG. 3 is a partial depiction of the safety barrier at the tension knob in conjunction with a hinged side arm bracket.

Extending from the upper half of the left and right sides of the safety barrier 2 are two upper side angle support arms 18 that connect pivotally at the safety barrier 2. When the safety barrier 2 is upright said supports 18 project from the safety barrier 2, at an approximate 45 degree angle, toward the inside truck bedrail 16 to a point of pivotal connection with lower side angle support arms 6 as shown in FIG. 3. The opposite end of lower support arms 6 are then connected to the lower mounting brackets 8. This junction is shown in closer detail in FIG. 5.

Both said support arms, which consist of an upper half 18 and a lower half 6, are joined at the middle by way of a pivoting joint and is depicted in FIG. 3 along with a hand operated tensioning knob 10 to secure said barrier at any preferred position. Support arms 6 and 18 could be comprised of any flat stock, non-corrosive steal or the like.

All parts of the collapsible truck cab safety barrier shall be of a thickness and or composition, so its structural integrity is such that it serves its main purpose of protecting truck cab occupants from the kinetic force of reasonable sized objects being thrown against the safety cab barrier. The safety barrier 2 is comprised, ideally, of non-corrosive metal or equivalent, and makes use of convenient hardware designed to expedite its use.

Whenever any of the parts are connected to one another, although some specific means may be shown or described, if, however they are not, it can be assumed that they are connected by any suitable means, pivotal, stationary or otherwise.

Operations—FIGS. 1A, 1B, 1C, and 3

The manner of using the collapsible truck cab safety barrier for a single person begins by first approaching the barrier 2 from within the back of the truck cargo area. Beginning with the safety barrier 2 in the upright, safety use position as depicted in FIGS. 1A and 1C, with one hand, support the top mid-section of the barrier while then loosening either one of the two hand-operated, quick tensioning knobs 10, counter-clockwise as shown in FIG. 3. After switching support hands, loosen the opposite tensioning knob 10. The operator can now pull the barrier 2 towards himself and downward to an inverted, out of the way position as depicted in FIG. 1B.

To re-erect the collapsible truck cab safety barrier, simply loosen one of the two tensioning knobs 10, rotate barrier 2 upwards to the in use, safety position and using tensioning knobs 10 to lock into position.

CONCLUSION, RAMIFICATIONS, AND SCOPE

Consequently, the reader will see that the embodiment of the collapsible truck cab safety barrier provides a further diversity of truck use and safety. Truck operators will now be able to apply and use preferred truck options such as caps, bed covers or rear split windows without compromising safety or undergoing hassled removal. One can now be used in conjunction with the other: safety and convenience. Safety when needed . . . out of the way when not and yet, always available without significantly encumbering cargo area.

Some additional ramifications could include providing some variation of a "handle" to assist manipulating safety devise from one position to another. Said handle could be externally adapted or cut into the top center area of the barrier in the shape of the width of an average hand. These above said adaptations and/or alterations might prevent user's hand from getting pinched between top of barrier and bed of truck when collapsing to the stowed away position.

Another variation of the preferred embodiment and its use is the containment of small items in the cargo area of the truck. Typically, groceries and the like end up rolling around in the back of the truck during transport. However, one might use the folded down position to "sandwich" any small articles between front wall of the cargo area beneath the rear window and the underside of the inverted barrier to contain said small articles.

Another modified version of the preferred embodiment is presented without side angle support arms. This version facilitates the application of said safety barrier to any truck without upstanding sidewalls. In either case, the novelty of the invention is preserved by way of it's folded down "stowed away position," which allows an unfettered view when not needed or access from the cab to cargo area through a rear split or retractable window.

Though the embodiment mentions the composition of material, it is conceivable that alternative, lightweight materials such as aluminum could facilitate its use while still providing a desired strength.

Although the description above contains many specifications, these should not be construed as limiting the scope of the invention, but as merely providing illustrations of some of the presently preferred embodiments of the invention. It will be obvious that embodiments described may be varied in many ways. Such variations are not to be regarded as a departure from the spirit and scope of the invention, and all such modifications as would be obvious to one skilled in the art are intended to be included within the scope of the present invention.

We claim:

1. A collapsible safety barrier for use with pickup trucks having a cargo bed with upstanding sidewalls, and designed so as not to encumber the tops of said truck bed sidewalls to allow for application of truck options or devises and shall have an upright, first position to serve as protection of rear window and occupants of truck cab when transporting cargo whereby said barrier folds down into cargo bed and secured when not needed, enabling unfettered view and not impeding access from within the cab to the cargo bed while still allowing unencumbered use of truck cargo bed.

2. The barrier of claim 1 shaped to the outline of a particular truck's rear window or the inside dimensions of any particular truck cap and consisting of a non-corrosive, tubular steal for its outer perimeter with its central portion consumed by non-corrosive, steel screen, grate or mesh material.

3. The barrier of claim 1 being attached to the truck bed cargo area by way of two hinges connecting the barrier's base perimeter to the inside front bed rail located beneath the rear cab window.

4. The barrier of claim 1 wherein it is optionally movable between a first, upright position, wherein it stands parallel to the truck cab rear window serving to protect the rear window or occupants of the truck's cab and a variation of second position wherein it is below the plane of the bottom of the rear window, both unfettering the view from within the cab and allowing access from within the cab through a rear split or retracting window.

5. The barrier of claim 1 wherein when erected to the safety position that the upper half be supported by two support arms comprised of two equal length halves with pins in the middle and said arms, each of which are connected at the upper portion of said barrier in such a way that allows for pivotal rotation and extending from opposite sides at approximately 45 degrees downward from a vertical radius and secured to a pair of offset brackets which also allow pivotal rotation or supporting arms.

6. The barrier of claim 1 wherein said pivoting side arm supports are secured thus, preventing barrier from moving from desired position by way of quick release tensioning knobs located at the point where the upper half of said upper support arm meets the lower half on the outboard side of each support arm and tightened or loosened by hand in typical right rotation to tighten and left rotation to loosen.

* * * * *